United States Patent [19]

Muller

[11] 3,713,505
[45] Jan. 30, 1973

[54] AUTOMATICALLY STEERED SELF-PROPELLED VEHICLE

[75] Inventor: Wolfram Muller, Leck, Germany

[73] Assignee: Robert Bosch GmbH, Stuttgart, Germany

[22] Filed: April 26, 1971

[21] Appl. No.: 137,354

[30] Foreign Application Priority Data

April 25, 1970 Germany............P 20 20 220.4

[52] U.S. Cl.............180/79.1, 180/98, 15/49 C
[51] Int. Cl. ........................................B62d 5/04
[58] Field of Search..................180/79, 79.1, 98

[56] References Cited

UNITED STATES PATENTS 3,415,335  12/1968  Wise.........................180/79
3,128,840  4/1964  Barrett.....................180/79.1 X
2,885,019  5/1959  Gardner....................180/79
3,381,456  5/1968  Taylor......................180/79.1 X
3,566,988  3/1971  Wise.........................180/79
3,570,227  3/1971  Bellinger..................180/79.1 X Primary Examiner—Kenneth H. Betts
Assistant Examiner—Leslie J. Paperner
Attorney—Michael S. Striker

[57] ABSTRACT

A self-propelled vehicle is automatically reversed and steered to a new path if sensors thereon sense an obstruction surrounding an area, or an obstacle in the area so that the vehicle moves forward, rearward and laterally over the entire unobstructed area for treating the same with a tool, such as a brush or agricultural implement.

21 Claims, 6 Drawing Figures

3,713,505

INVENTOR
WOLFRAM MÜLLER

By
his ATTORNEY

AUTOMATICALLY STEERED SELF-PROPELLED VEHICLE

BACKGROUND OF THE INVENTION

The present invention relates to an unmanned vehicle for treating the unobstructed part of an area having obstructions preventing continued movement of the vehicle.

Vehicles of this type are known which move along guiding conductors generating an alternating field. The actual path of the vehicle is determined by the guiding conductors, and the vehicle is incapable of recognizing obstructions which are located in the path of movement determined by a conductor, which was placed there after the operation of the vehicle was started. Since the guiding conductors are usually under the floor, a changing of the path is not easily possible. The arrangement of the prior art is unsuitable under conditions where loads are deposited at varying and different places, as may occur in storage areas and warehouses. It may occur, that a truck deposits its load on a conductor, so that the vehicle, moving along the guiding conductor, would ram the load.

SUMMARY OF THE INVENTION

It is one object of the invention to provide an automatically steered self-propelled vehicle which is capable of moving over areas having obstructions.

Another object of the invention is to provide an automatically steered self-propelled vehicle which will recognize newly placed obstruction in the area, and automatically steer around the same.

Another object of the invention is to provide a vehicle capable of cleaning or otherwise treating the entire unobstructed portion of an area which has obstructions.

With these objects in view, the present invention provides a vehicle with sensing means for recognizing obstructions located in the path of movement of the vehicle, and a control device which causes a change of the direction of movement of the vehicle by steering means on the vehicle depending on the position of an obstruction located in the path of movement of the vehicle.

One embodiment of an automatically steered self-propelled vehicle comprises a vehicle frame located on an unobstructed portion of an area having obstructions; a motor on the frame for propelling the same at least in a forward direction; steering means for steering the frame; sensing means on the frame for generating a signal when sensing an obstruction during movement of the vehicle; and a control device including steering control means, and preferably reversing control means, responsive to signals of the sensing means to control the steering means and motor.

In this manner, a change of the direction of movement of the vehicle is obtained when any obstruction is sensed, so that the vehicle continues to move on the unobstructed portion of the area.

Preferably, the motor is reversible for moving the vehicle in a forward direction until an obstruction surrounding the area is sensed, whereupon the motor is reversed, and the vehicle moves in a rearward direction toward another portion of the obstruction surrounding the area, where the motor is again reversed. Similarly, when the vehicle senses an obstruction within the unobstructed area, the vehicle is reversed. The control device causes steering of the reversed vehicle to a new path, after the vehicle has reached another portion of the surrounding obstruction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
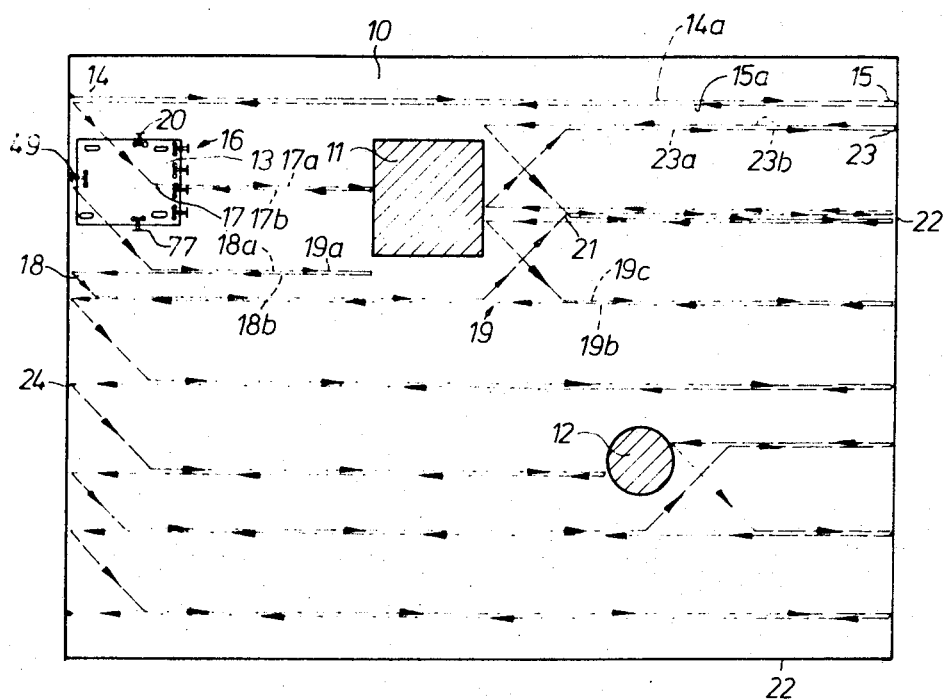
FIG. 1 is a schematic plan view illustrating an area having obstructions, and a vehicle on the unobstructed portion of the area.

Referring now to FIG. 1, an area 10 has obstructions 11 and 12. A self-propelled vehicle 13, shown in greater detail in FIG. 3, may carry rotary-sweeping brushes for cleaning the unobstructed portion of the area 10. The obstructions 11 and 12 project above the surface of the area, and would obstruct the movement of vehicle 13. The area 10 is surrounded by a suitable obstruction by which vehicle 13 is prevented to move out of and beyond the area.

Figure 3:
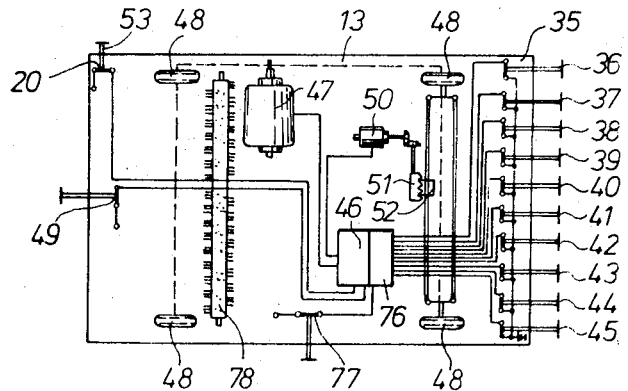
FIG. 3 is a schematic plan view of a vehicle according to the invention.

The vehicle 13 is placed at the region 14 of the surrounding obstruction, and is driven by a motor 47 driving wheels 48, to move along a straight path 14a shown with broken lines and arrowheads, until reaching the region 15 of the surrounding obstruction 22, which is recognized by front sensor means 16 of vehicle 13. The front sensor means 16 generate a reversing signal which causes reversing of motor 47 so that the vehicle 13 moves in a rearward direction along the path 15a back to the region 14 of the surrounding obstruction 22. The rear sensor 49 senses the position of the vehicle, and causes again reversing of motor 48, so that the vehicle is again driven to move in forward direction toward the other end of the area 10. The vehicle 13 includes a control device 46 in which the signals generated by the sensing means 16 and 49 are evaluated for initiating required operations. In the region 14, the steering means of the vehicle are operated under the control of the control device 46 to turn the wheels 48 a suitable angle, for example 90° or 45°, to a new path starting at point 17. The distance between the first paths 14a and 15a have a new path which corresponds to the width of vehicle 13 so that the entire area 10 would be successively swept by vehicle 13, in no obstructions 11 and 12 were found in area 10. The return of wheels 48 to the normal position for forward and rearward movement, is effected by resilient means when the steering motor 50 is de-energized. The steering motor 50 drives, when energized, a spindle 51 by which a gear 52 is displaced for operating a linkage 52a by which the wheels 48 are angularly displaced, as shown in FIG. 3. Resilient means 94, 95 connected with linkage 91 straighten wheels 48 out when steering motor 50 is de-energized.

Vehicle 13 moves now along a path 17a until the sensing means 16 sense the obstruction 11, which causes reversal of motor 47 by the control device 46 so that vehicle 13 moves along the path 17b in a rearward direction toward point 17 where rear sensor 49 recognizes the boundary 22, and causes reversal of motor 47. The steering means 50, 51, 52, 48 are again operated to steer the vehicle to a new path 18a on which the vehicle moves in forward direction toward the obstruction 11. Upon approaching the obstruction 11, the sensing means 16, which includes a row of sensors, recognizes that the obstruction 11 only partially projects into the new path 18a. Since only a part of the row of sensors 16 engage the obstruction, the row of front sensors 16 recognizes how far obstruction 11 projects into the new path 18a. The motor of the vehicle 47 is reversed, the vehicle moves back in reverse direction along the path 18b, and is automatically steered, in accordance with the information derived from the row of sensors 16, a smaller transverse distance to the new path 19a where the vehicle moves forward to the point 19 just bypassing the lateral surface of obstruction 11. A lateral sensor 20 having a projecting actuator 53, as shown in FIG. 3, preferably constructed as a microswitch, engages the lateral surface of the obstruction 11 and is closed, but when vehicle 13 has passed the obstruction 11, the sensor switch 20, 53 is again released by the lateral surface of obstruction 11 and the actuator 53 moves again transversely to open switch 20. In this manner, information is transmitted to the control device 46 that the obstruction 11 has been passed, and the control device 46 energizes the steering motor 50 to steer the vehicle 13 to a new path located between the obstruction 11 and the surrounding obstruction 22, and the steering means is controlled to straighten out the wheels 48 at the point 21 so that the vehicle moves in the initial forward direction, until the motor 47 is reversed at the boundary obstruction, and vehicle 13 moves back until the rear sensor, also a microswitch 49, again senses the obstruction 11 during rearward movement of vehicle 13.

As described above, motor 47 is again reversed and the steering means operated so that vehicle 13 moves along path 23a to the point 23 where motor 47 is reversed so that the vehicle moves rearward along path 23b until the rear sensor 49 senses the obstruction 11, and causes steering of vehicle 13 back to point 21, rearward toward obstruction 11, where the vehicle is steered again to move onto the track 19c where it moves forwardly until reversed by the boundary obstruction 22 and moves along the path 19b to the other end of the area 10, where the movements of the vehicle 13 are controlled as described above, and as shown in broken lines provided with arrowheads in FIG. 1. When vehicle 13 approaches the lateral boundary obstruction 22a, an end sensor 77 senses the obstruction 22a, and causes deenergization of motor 47 so that the vehicle stops, when the front sensor means 16 engages the other end of the boundary obstruction.

Figure 2:
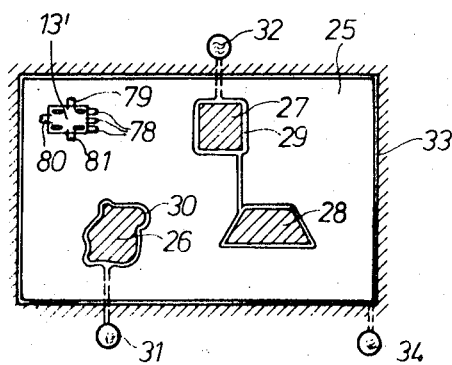
FIG. 2 is a schematic view illustrating an area having obstructions surrounded by conductors, and a vehicle on the unobstructed portion of the area.

The embodiment of FIG. 1 operates due to mechanical operation of sensor switches. However, if the obstructions are recesses in the surface of the area, as shown at 26, 27, and 28 in FIG. 2, wire loops 29 and 30 are placed on the surface of the area around the obstructions 26, 27, 28, and are connected to alternating current generators 31 and 32, as shown in FIG. 2. The corresponding loop 33 of a conductor may form the boundary obstruction around the area 25, and is supplied by alternating current generator 34 with a required current, so that the currents flowing in the wire loops create alternating fields. The vehicle 13' is provided with front sensors 78, lateral sensor 79, stop sensor 81, and rear sensor 80, each of which includes a coil responsive to the alternating fields and controlling the reversing and steering operations of vehicle 13'. The pattern according to which the area 25 is swept by the vehicle 13', is the same as described with reference to FIG. 1.

Figure 5:
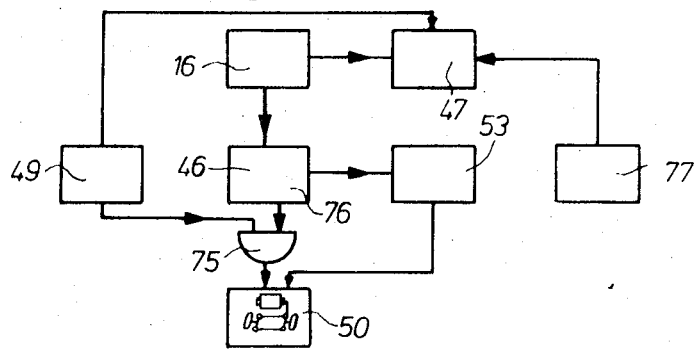
FIG. 5 is a diagram illustrating schematically the interconnection between elements of the control device of the vehicle.

Referring now particularly to FIG. 3, the forward end of the supporting frame 35 of vehicle 13, carries 10 microswitches 36 to 45 arranged in a horizontal row, which either in the actuated condition, or in the normal position, generate a signal for the control device 46, which includes a storage device 76, as shown in the schematic diagram of FIG. 5. The storage device 76 may consist of bistable multivibrators, which store the width of the portion of the vehicle 13 which is stopped by an obstruction. Each microswitch 36 to 45 is correlated with a certain information which is introduced into the control device 46 and the storage device 76, so that the width of an obstruction can also be determined by the sensing means 36 to 45 when the obstruction is narrow, so that only one microswitch 41, for example, engages the obstruction, while the other microswitches 36–40 and 42–45 are free. In accordance with the signals from the sensing means, which indicate that an obstruction or obstacle is located in the path of movement of the vehicle 13, the electromotor 47, which is the drive motor of the vehicle 13, is reversed. As explained above, the wheels 48 are then driven in a reverse direction of rotation, and the movement of the vehicle 13 takes place opposite to the initial forward direction. This rearward movement is maintained until the microswitch 49 at the rear end of frame 35 senses an obstruction, and generates a signal which indicates that the vehicle 13 has arrived at the start of the respective path of movement. In accordance with the width of the obstacle determined by the front sensor microswitches 36 to 45, vehicle 13 is moved laterally the distance determined by the microswitches 36 to 45.

If the sensed obstruction is wider than the vehicle 13, which is the case when the front sensor microswitches 36 to 45 engage the boundary obstruction 22 at the end of a forward movement, the control device 46 controls the steering means to move the vehicle in transverse direction its entire width.

When the lateral sensor 53 senses the end of a passed obstruction 11, it generates a signal to the control device 46, which causes a transverse steering of the vehicle 13 for its entire width in the same transverse direction in which sensor 53 projects, so that the vehicle can move between the front face of obstruction 11 and the boundary obstruction 22 so that no part of the surface area is skipped.

Figure 4:
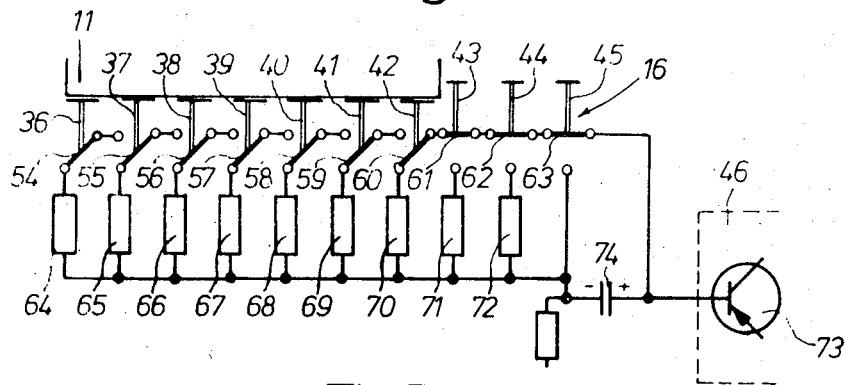
FIG. 4 is a diagram illustrating an electric circuit for the sensing means with which the vehicle of FIG. 3 is provided.

FIG. 4 illustrates an electric circuit for the sensor microswitches 36 to 45. Each microswitch 35 to 45 has a shiftable contact 54 to 63. Shiftable contacts of sensor switches, which are not actuated by an obstruction, are connected in series as shown for the shiftable contacts 61, 62, 63 of the sensor switches 43, 44, 45. The series-connected contacts 61, 62, 63 are connected to the positive terminal of a capacitor 74, which is also connected to the base of an input transistor 73 of the control device 46. The microswitches, which engage an obstruction, for example the microswitches 37 to 42 in FIG. 4, displace the respective shiftable contacts 54 to 60 to positions connected with the resistors 64 to 72, respectively, which have different resistances, which differ by the same amount. One free contact of microswitch 45, which is open, is connected to the interconnected ends of resistors 64 to 72, and to the negative terminal of capacitor 74. Consequently, the input electrode of the input transistor 73 receives an input signal corresponding to the charge of capacitor 74, and representing the width of the sensed obstruction 11.

Referring now to the schematic diagram of FIG. 5, the steering means, represented by reference numeral 50, are connected with the storage device 76 by an AND gate 75 which permits passage of a signal only when an output signal is generated by rear sensor switch 49 together with a signal from storage means 76 for causing operation of the steering means 50. The storage device 76, which may consist of multivibrators respectively correlated with the front microswitches 37, 35 is constructed so that the multivibrators switch to one or the other position depending on the condition of the microswitches 36 to 45, and remain in the shifted condition until the vehicle 13 has been steered into the next path. Storage device 76 is connected with the front sensing means 16 for recognizing the obstructions, which include the electromechanical microswitches 36 to 45.

In accordance with the determined value corresponding to the width of the obstruction 11 or 12, drive motor 47 is reversed so that the vehicle moves in the opposite direction until rear sensor switch 49 generates a signal which causes again reversal of drive motor 47 without energization of the same, as will be explained hereinafter. First, the steering motor 50 is operated so that when drive motor 47 is again energized, the vehicle 13 is steered laterally to the next following path. After the lateral displacement of vehicle 13, the wheels 46 are automatically straightened so that vehicle 13 drives in forward direction until sensing another obstruction in its path, or until arriving at the boundary obstruction 22.

By passing of an obstruction 11 or 12, the lateral sensor 53 generates a signal which influences the steering motor 50 to cause movement of the vehicle in the lateral direction into the omitted part of the area. The end switch 77 on the other side of the vehicle 13 is actuated when engaging the lateral portion 22a of the boundary obstruction, and disconnects drive motor 47 from the voltage source.

Figure 6:
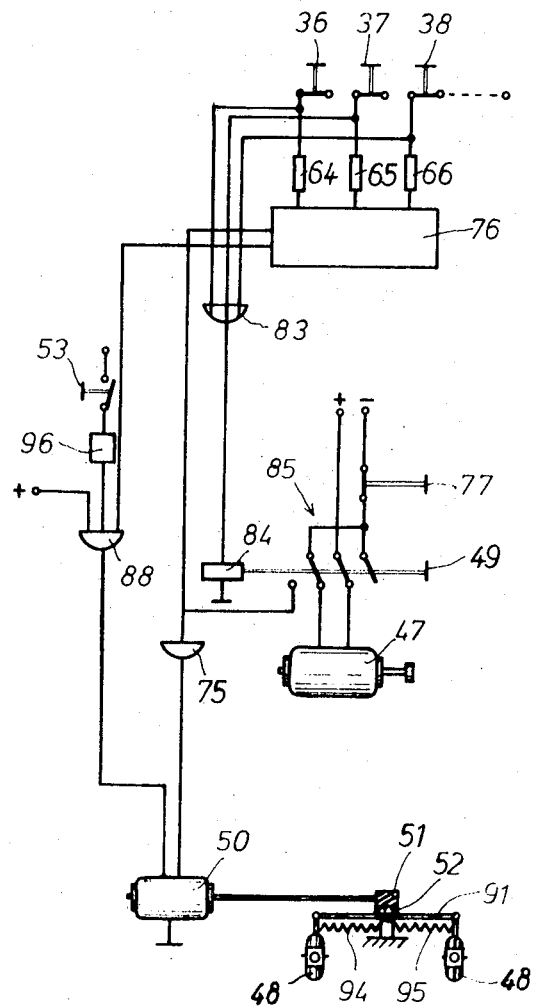
FIG. 6 is a diagram schematically illustrating the control of the steering means of the vehicle.

The storage 76 may be constituted by a capacitor, but it is also possible to provide a counting storage, as shown in FIG. 6. Such a storage 76 counts the actuated front sensor switches 36 to 45, and the counted number of operated front sensing switches is stored, until no longer required. Storage means of this type are well known to those skilled in the art.

Referring now to FIG. 6, three microswitches 36, 37, 38 are shown, respectively connected with resistors 64, 65, 66, as also shown in FIG. 4. Microswitches 36 to 45 can be connected by resistors 64 to 72 with storage device 76 of the control device 46.

Switches 36 to 38, for example, are connected by an OR gate 83 with the winding 84 of a relay. Relay 84 operates a reversing switch 85 which is also operable by the rear sensor 49. Reversing switch 85 is connected with drive motor 47 for reversing the same, so that the motor 47 is reversed when front sensor switches 36, 37, 38 simultaneously abut the obstruction during forward movement, or when rear sensor 49 abuts the boundary obstruction during rearward movement of the vehicle 13. The stop switch 77 is connected into the circuit of drive motor 47, so that the same is disconnected from the voltage source when the lateral boundary obstruction 22a is sensed by the sensor 77.

The storage means 76 is connected with the first input of an AND gate 75 whose second input is connected with a contact of the reversing switch 85. The output of the AND gate 75 is connected with the steering motor 50. Storage means 78 is also connected with the first input of an AND gate 88 at whose second input a voltage is applied, and whose third input receives a signal from the lateral sensor switch 53. A differential element 96 connects lateral sensor switch 53 with the AND gate 88, and has the effect that only when a signal is generated by the lateral sensor switch 53, a pulse opens the AND gate 88. The output of the AND gate 88 is connected with the steering motor 50 which, as explained above, operates a worm spindle 51 and a gear segment 52 for displacing a steering link 91 by which the wheels 48 of the vehicle 13 can be angularly displaced. The two springs 94 and 95 are acting on linkage 91 to turn wheels 48 to a straight position when motor 50 does not operate.

When the vehicle 13 senses an obstruction during forward movement, at least one of the front switches 36 to 45 is actuated, so that a pulse reaches the winding 84 of the relay of the reversing switch 83 to the OR gate 83 so that drive motor 47 is reversed, causing the vehicle 13 to move along the same path as before in the reverse opposite direction. The width of the obstruction is determined in the storage means 76 by the number and position of the actuated front sensor switches 36 to 45. When vehicle 13 has arrived in its initial position, the rear sensor 49 is operated by the boundary obstruction, so that the reversing switch 85 is shifted and the drive motor 47 is set to forward movement. At the moment in which the rear sensor 49 responds, and reversing switch 85 is shifted, the voltage source of motor 47 is connected with the AND gate 75 so that steering motor 50 is energized during a certain time in accordance with the electric charge stored in storage means 76, for example in a capacitor, the charge representing the width of the obstruction in the path of movement of the vehicle 13. The time during which steering motor 50 is energized and turns wheels 48, is so determined that the wheels are turned 90°, and the vehicle moves in a direction transverse to its previous direction of movement until, in accordance with the amount of electricity stored in storage means 76, the AND gate 75 closes again so that steering motor 50 is reset, and springs 94, 95 turn wheels 48 back to the initial straight position.

During the following movement of vehicle 13, the lateral sensor switch 53 is depressed, and nothing happens because the differential element 96 blocks the generated signal. When vehicle 13 has passed the obstruction, the actuator of the lateral sensor switch 53 is urged by a spring to move outward again so that a pulse is transmitted through the differential element 96 to the AND gate 88 and opens the same so that steering motor 50 is then connected with the voltage, but in a different polarity, as compared with the operation when rear sensor 49 sensed the rear portion of boundary obstruction 22. Consequently, wheels 48 are again turned 90°, but in the opposite direction, so that the vehicle 13 moves laterally, as viewed in FIG. 1 from the point 19 to the point 21 of its path. After the vehicle 13 has moved transversely a distance corresponding to the width of the obstruction 11, the AND gate 88 closes, and steering motor 50 is no longer operated, so that springs 94 and 95 turn wheels 48 back to a straight position for forward and rearward movement. At the same time when steering motor 50 is disconnected, a signal may be transmitted to storage means 76 which causes clearing of storage means 76 since the signal stored in the same is no longer required.

It will be understood that each of the elements described above, or two or more together, may also find a useful application in other types of vehicles for automatically treating an obstructed surface differing from the types described above.

While the invention has been illustrated and described as embodied in an automatically steered self-propelled vehicle changing its direction of movement automatically when sensing an obstruction in its path, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. Automatically steered self-propelled vehicle for movement over the unobstructed portion of an area having obstructions, comprising a vehicle frame located on said unobstructed portion; motor means on said frame for propelling the same at least in forward direction; steering means on said frame for steering said frame; sensing means on said frame for generating a signal when sensing an obstruction during movement of said frame in said direction, and including front sensor means including a transverse array of front sensors for individually sensing an obstruction, and generating individual signals; and a control device including steering control means responsive to said signal of said sensing means and to said individual signals of said front sensors to operate said steering means to change the direction of movement of said frame so that said frame passes said obstruction and moves on said unobstructed portion of said area.

2. Vehicle as claimed in claim 1 comprising a tool mounted on said frame for treating said unobstructed portion of said area.

3. Vehicle as claimed in claim 1 in combination with at least one conductor surrounding an obstruction in said area; means for supplying an alternating current to said conductors; and wherein said sensing means include induction coils responsive to the alternating field around said conductor to generate said signals for operating said steering means.

4. Vehicle as claimed in claim 3 in combination with another conductor surrounding said area and connected with said supplying means so that said induction coils respond to an alternating field around said other conductor.

5. Automatically steered self-propelled vehicle for movement over the unobstructed portion of an area having obstructions, comprising a vehicle frame located on said unobstructed portion; reversible motor means on said frame for propelling said frame in forward and rearward directions; steering means on said frame for steering said frame; sensing means on said frame for generating a steering signal when sensing an obstruction during forward and rearward movement of said frame, said sensing means including front sensor means and rear sensor means for generating reversing signals when sensing obstructions during forward and rearward movement of said frame, said front sensor means including a transverse row of front sensors for individually sensing an obstruction and generating individual steering signals; and a control device including steering control means responsive to said individual steering signals to operate said steering means to change the direction of movement of said frame so that said frames move on said unobstructed portion of said area, and reversing control means including reversing means responsive to said reversing signals to reverse said motor means so that said frame moves away from any sensed obstruction.

6. Vehicle as claimed in claim 5 wherein said obstructions include boundary obstructions surrounding said area, and at least one obstruction in said area; wherein sensing of said one obstruction and of a first portion of said boundary obstruction by said front sensors causes said reversing control means to reverse said motor means until said rear sensor means senses a second portion of said boundary obstruction and causes said reversing control means to again reverse said motor means; and wherein said rear sensor means also control said steering control means to operate said steering means so that said vehicle moves forward along a new path toward said first portion of said boundary obstruction, said new path being spaced from the former path a distance corresponding to the sensed width of said one obstacle so that the same is passed by said frame.

7. Vehicle as claimed in claim 6 wherein said sensing means include a lateral sensor projecting laterally from one side of said frame for engaging said one obstruction while said vehicle passes the same on said new path and for separating from said one obstruction when said frame has passed said one obstacle; said lateral sensor transmitting a return signal to said control device when separating from said one obstruction; wherein said control device responds to said return signal to operate said steering means so that said frame moves to said one side a distance corresponding to the width of the frame to a position located between said one obstruction and said boundary portion and then moves in forward direction away from said one obstruction and toward said boundary obstruction.

8. Vehicle as claimed in claim 5 wherein said steering control means respond to said control signal and to said reversing signal of said sensing means during rearward movement to actuate said steering device to first steer said frame in a direction transverse to said forward and rearward directions, and to then steer said frame into said forward direction.

9. Vehicle as claimed in claim 8 wherein said transverse direction is perpendicular to said forward and rearward direction.

10. Vehicle as claimed in claim 5 wherein said obstructions include obstructions surrounding said area.

11. Vehicle as claimed in claim 10 wherein said obstructions include at least one obstruction in said area.

12. Vehicle as claimed in claim 5 wherein said reversing means includes a reversing switch responsive to said reversing signals.

13. Automatically steered self-propelled vehicle for movement over the unobstructed portion of an area having obstructions, comprising a vehicle frame located on said unobstructed portion; reversible motor means on said frame for propelling said frame in forward and rearward directions; steering means on said frame for steering said frame; sensing means on said frame for generating a steering signal when sensing an obstruction during forward and rearward movement of said frame, said sensing means including front sensor means and rear sensor means for generating reversing signals when sensing obstructions during forward and rearward movement of said frame, said sensing means further including a lateral sensor at least on one side for sensing an obstruction while passing the same in said forward direction, and generating a return signal at the end of said obstruction; and a control device including steering control means responsive to said steering signal to operate said steering means to change the direction of movement of said frame so that said frame moves on said unobstructed portion of said area, and reversing control means including reversing means responsive to said reversing signals to reverse said motor means so that said frame moves away from any sensed obstruction, said steering control means receiving said return signal and responding to said return signal to operate said steering means to steer said frame transversely to a position located forwardly of said obstruction and then to steer said frame again in forward direction.

14. Vehicle as claimed in claim 13 wherein said sensing means includes a stop sensor on the other side of said frame for sensing a lateral obstruction bounding said area, and transmitting a stop signal to said control device when sensing said lateral obstruction; and wherein said control device is responsive to said stop signal to disconnect said motor so that said frame stops.

15. Automatically steered self-propelled vehicle for movement over the unobstructed portion of an area having obstructions, comprising a vehicle frame located on said unobstructed portion; reversible motor means on said frame for propelling said frame in forward and rearward directions; steering means on said frame for steering said frame; sensing means on said frame for generating a steering signal when sensing an obstruction during forward and rearward movement of said frame, said sensing means including front sensor means and rear sensor means for generating reversing signals when sensing obstructions during forward and rearward movement of said frame, at least said front sensor means including a horizontal row of electromechanical front sensor switches so that only a part of said front sensor switches is operated when a sensed obstruction has a lesser width than said frame; and a control device including steering control means responsive to said steering signal to operate said steering means to change the direction of movement of said frame so that said frame moves on said unobstructed portion of said area, and reversing control means including reversing means responsive to said reversing signals to reverse said motor means so that said frame moves away from any sensed obstruction, said steering control means and said steering means effecting lateral movement of said frame for a distance corresponding to the width of said part of said front sensor switches.

16. Vehicle as claimed in claim 15 wherein said front sensor switches have shiftable contacts connected in series in the open condition of said front sensor switches; said control device including a different resistor for each front sensor switch, said resistors having a series of ends connected with said contacts in the closed condition of said front sensor switches, and having the other ends connected to each other and to said control device.

17. Vehicle as claimed in claim 16 wherein said control device includes a capacitor having first and second terminals connected with said other ends of said resistors and with said series-connected shiftable contacts, respectively; said control device including an input transistor having a base connected with said first terminal.

18. Automatically steered self-propelled vehicle for movement over the unobstructed portion of an area having obstructions, comprising a vehicle frame located on said unobstructed portion; reversible motor means on said frame for propelling said frame in forward and rearward directions; steering means on said frame for steering said frame; sensing means on said frame for generating a steering signal when sensing an obstruction during forward and rearward movement of said frame, said sensing means including front sensor means and rear sensor means for generating reversing signals when sensing obstructions during forward and rearward movement of said frame; and a control device including steering control means responsive to said steering signal to operate said steering means to change the direction of movement of said frame so that said frame moves on said unobstructed portion of said area, and reversing control means including reversing means responsive to said reversing signals to reverse said motor means so that said frame moves away from any sensed obstruction, said steering control means including a steering motor for operating said steering means to move said frame transversely out of a normal position when said control device receives a reversing signal, timing means for energizing said steering motor for a time dependent on the signals of said front sensor means, and means for returning said steering means after said time to the initial normal position for straight movement.

19. Vehicle as claimed in claim 18 wherein said means for returning said steering means include resilient means for returning said steering means and de-energized steering motor after said time to the initial normal positions.

20. Vehicle as claimed in claim 18 wherein said frame includes wheels, and means supporting said wheels for angular steering movement; and wherein said steering control means include a transmission connecting said steering motor with said wheels.

21. Vehicle as claimed in claim 20 wherein said steering motor is energized under control of said control device and sensing means until said wheels have turned 90°, and is then de-energized for permitting return of said wheels by said resilient means.

* * * * *